US008040768B2

(12) United States Patent
Minabe et al.

(10) Patent No.: US 8,040,768 B2
(45) Date of Patent: *Oct. 18, 2011

(54) INFORMATION RECORDING APPARATUS

(75) Inventors: Kouji Minabe, Hitachinaka (JP); Hideo Nishijima, Hitachinaka (JP); Hiroaki Ono, Fujisawa (JP); Kazunori Uemura, Hitachinaka (JP); Masahiro Fujimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/893,910

(22) Filed: Aug. 17, 2007

(65) Prior Publication Data
US 2007/0297308 A1 Dec. 27, 2007

Related U.S. Application Data

(63) Continuation of application No. 11/515,108, filed on Aug. 31, 2006, now Pat. No. 7,269,112, which is a continuation of application No. 10/424,456, filed on Apr. 25, 2003, now Pat. No. 7,116,620.

(30) Foreign Application Priority Data

Apr. 25, 2002 (JP) ................................. 2002-123386

(51) Int. Cl.
*G11B 7/00* (2006.01)
(52) U.S. Cl. ............... 369/47.32; 369/47.33; 369/47.39; 369/53.27
(58) Field of Classification Search ............... 369/47.32, 369/47.33, 47.39
See application file for complete search history.

(56) References Cited

U.S. PATENT DOCUMENTS

| 5,675,559 | A |   | 10/1997 | Maeda et al. |
| 5,914,927 | A | * | 6/1999  | Fukuda et al. ............. 369/47.51 |
| 6,594,207 | B2 |  | 7/2003  | Suzuki |
| 6,744,715 | B2 |  | 6/2004  | Chen |

(Continued)

FOREIGN PATENT DOCUMENTS

JP 2-093032 4/1990

(Continued)

OTHER PUBLICATIONS

Japan Patent Office Inquiry for patent application JP2006-30415 (Sep. 14, 2010).

(Continued)

*Primary Examiner* — Lixi C Simpson
(74) *Attorney, Agent, or Firm* — Kilpatrick Townsend & Stockton LLP

(57) ABSTRACT

An information recording apparatus such as an optical disc that can avoid an unrecordable condition between a power-on operation and an available state for recording thereby to solve a problem that an image taking chance is missed in a recording step, wherein its constitution is such that: receiving a command to turn on the apparatus after switching, a system controller drives a power-supply circuit to activate a drive controller and a memory controller; if the optical disc is not replaced while in power-off operation by a sub-battery, the system controller issues a request for high-speed activation, based on information stored in an EEPROM, to the drive controller, and drives plural drive control units one after another thereby to establish an activation period confirmedly, allowing the memory controller to accept a request for a recording start from the system controller without waiting for a report of activation completion to be issued by the drive controller.

2 Claims, 4 Drawing Sheets

U.S. PATENT DOCUMENTS

| | | |
|---|---|---|
| 6,788,341 B2 | 9/2004 | Tsunoda et al. |
| 6,883,111 B2 * | 4/2005 | Yoshida et al. .................. 714/6 |
| 7,016,272 B2 | 3/2006 | Enokihara |
| 7,116,620 B2 * | 10/2006 | Minabe et al. ............. 369/53.27 |
| 7,123,554 B2 | 10/2006 | Kaku |
| 7,269,112 B2 * | 9/2007 | Minabe et al. ............. 369/53.31 |
| 7,391,964 B2 * | 6/2008 | Marumori et al. ............ 386/126 |
| 2001/0004341 A1 | 6/2001 | Suzuki et al. |
| 2002/0012298 A1 * | 1/2002 | Suzuki ........................ 369/47.3 |
| 2002/0039479 A1 * | 4/2002 | Watanabe et al. ............... 386/46 |
| 2002/0150011 A1 * | 10/2002 | Tsukihashi et al. ........ 369/47.33 |
| 2002/0191951 A1 * | 12/2002 | Sodeyama et al. ............ 386/46 |
| 2003/0058352 A1 | 3/2003 | Nishijima et al. |
| 2003/0067854 A1 * | 4/2003 | Chen ........................ 369/47.42 |
| 2003/0095484 A1 * | 5/2003 | Motohashi ................. 369/53.15 |
| 2003/0151992 A1 * | 8/2003 | Fujimoto et al. ........... 369/47.14 |

FOREIGN PATENT DOCUMENTS

| | | |
|---|---|---|
| JP | 06-162734 A | 6/1994 |
| JP | 06-325473 A | 11/1994 |
| JP | 08-045184 A | 2/1996 |
| JP | 08-124359 A | 5/1996 |
| JP | 10-93918 | 4/1998 |
| JP | 11-185449 A | 7/1999 |
| JP | 11-353738 | 12/1999 |
| JP | 2000-293925 A | 10/2000 |
| JP | 2001-175512 A | 6/2001 |
| JP | 2001-256716 A | 9/2001 |
| JP | 2001-338458 A | 12/2001 |
| JP | 2002-050131 A | 2/2002 |
| JP | 2002-074694 A | 3/2002 |
| JP | 2002-93023 | 3/2002 |
| JP | 2002-093048 A | 3/2002 |

OTHER PUBLICATIONS

Japan Patent Office Notice of Reason for Rejection for patent application JP2007-317856 (Jan. 4, 2011).

* cited by examiner

INFORMATION RECORDING APPARATUS

CROSS-REFERENCE TO RELATED APPLICATION(S)

This is a continuation of U.S. patent application Ser. No. 11/515,108, filed Aug. 31, 2006, which is a continuation of U.S. patent application Ser. No. 10/424,456, filed Apr. 25, 2003, which claims priority to JP Application No. 2002-123386, filed Apr. 25, 2002, the entire disclosure of which is incorporated herein by reference.

BACKGROUND OF THE INVENTION

The present invention relates to an apparatus for recording information onto a recording medium, particularly to operations from a power-on event of the apparatus to a state in which the apparatus is capable of starting a step to record information onto the recording medium.

A conventional optical disc drive suffers from disadvantageous long time for its activation, i.e., from a halt condition of disc rotation to a steady-state condition of the rotation. Thus, an information recording apparatus such as the type for recording an image taking signal onto a recording medium, can not record the image taking signal onto the recording medium during some time lapsing after it has turned on, raising a problem that an image taking chance is missed.

In order to solve the problem, in an apparatus disclosed in JP-A No. 93918/1998, the following method is adopted to avoid a state in which an image taking signal cannot be recorded onto a recording medium.

In the apparatus cited above, after the user turns on the power-supply of the apparatus, a compressed and encoded signal obtained as a result of compression and encoding steps carried out on an image taking signal is stored temporarily in a memory means till a disk drive unit employed in the apparatus enters a state of being capable of recording information onto a recording medium. The compressed and encoded signal is referred to hereafter simply as an image taking signal. Then, at a stage the disk drive unit employed in the apparatus enters a state of being capable of recording information onto a recording medium, a recording means employed in the disc drive unit starts a recording operation while the operation of storing the following image taking signal into the memory means is being continued.

If the amount of information transferred from an image taking unit employed in the apparatus to the memory means per unit time is smaller than the amount of information recorded by the information recording means onto the recording medium per same unit time, the amount of information stored in the memory means will decrease gradually. At a stage the amount of information stored in the memory means becomes zero, the image taking signal is supplied from the image taking unit directly to the information recording means employed in the disc drive unit. This state is continued thereafter till the user enters a command to stop the recording operation.

If residual information is left in the memory means at the time the user enters a command to stop the recording operation, the recording operation is continued till its completion by recording all the residual information onto the recording medium.

As another method, it is also to possible to record an image taking signal, which has been stored temporarily in the memory means till a disk drive unit employed in the disc drive unit enters a state of being capable of recording information, onto a recording medium later. In this case, a seek operation is carried out to move a drive head unit to a position the recording medium. This position on the recording medium follows a storage area reserved for the image taking signal stored temporarily in the memory means. Then, an image taking signal following the image taking signal stored temporarily in the memory means is supplied to the information recording means employed in the disc drive unit, taking precedence of the image taking signal stored temporarily in the memory means. Finally, after the user enters a command to stop the recording operation, the image taking signal stored temporarily in the memory means is recorded into the reserved storage area on the recording medium.

The methods described above are each disclosed as a method to avoid a state of being incapable of recording a signal onto a recording medium after the power-supply is turned on till the disc drive unit reaches a predetermined rotation.

BRIEF SUMMARY OF THE INVENTION

In the conventional technology described above, the following points are not specially taken into consideration.

In the first place, after the user turns on the power-supply of the apparatus, an image taking signal is stored temporarily in a memory means till a disk drive unit employed in the apparatus enters a state of a stable rotation. Then, at a stage the disk drive unit employed in the apparatus enters a state of a stable rotation, a recording means employed in the disc drive unit starts a recording operation and the amount of information stored in the memory means decreases gradually. At a stage the amount of information stored in the memory means becomes zero, the image taking signal is supplied from the image taking unit directly to the information recording means employed in the disc drive unit. In order to supply the image taking signal from the image taking unit directly to the information recording means, a switching means is required. In addition, a switching timing must be identified. In order to determine a switching timing, the state of rotation must be observed all the time in order to make a difficult decision as to whether to supply the image taking signal from the image taking unit to the memory means or directly to the information recording means.

It is thus a first object of the present invention to provide an algorithm that can be used with ease to eliminate the switching means.

In the second place, the user does not always start a recording operation when the power-supply is turned on. In the conventional technology described above, however, neither a method to clearly identify a state allowing the user to start a recording operation nor a method to determine a timing to start a recording operation is specially disclosed. It is thus a second object of the present invention to provide a method to inform the user of the fact that a recording operation can be carried out even though operations to activate components employed in the drive have not been completed after the user has turned on the power-supply of the apparatus.

In the third place, in a step to activate an optical disc drive, in addition to elements for starting a disc rotation, the following stepping components are required.

(1) A laser diode and a laser-emission control circuit. The laser diode is a component for emitting a laser to be radiated to the recording medium. The laser-emission control circuit is a circuit for controlling the output of the laser diode to a magnitude corresponding to a signal to be recorded onto the recording medium or a predetermined magnitude.

(2) An opto-electrical conversion circuit for converting a beam, which is reflected by the disc recording medium at a quantity corresponding to pits and recording marks on the disc recording medium when the laser is emitted at a predetermined output magnitude, into an electrical signal.

(3) An object lens, an actuator mechanism and a control circuit of the actuator mechanism. The object lens is a component for converging the laser beam. The actuator mechanism is a component for moving the object lens in the same direction as the optical axis in order to focus the laser beam on the surface of the disc recording medium in the so-called focusing operation and for moving the object lens in the radial direction of the recording medium in order to place the spot of the focused laser beam on a desired track of the disc recording medium in the so-called tracing (or tracking) operation.

(4) A spindle motor, a control circuit of the spindle motor, a base, a slider mechanism and a control circuit of the slider mechanism. The spindle motor is a component for rotating the disc recording medium. The base is a component on which at least the object lens and the actuator mechanism are mounted. The slider mechanism is a component for moving the base. The base and the slider mechanism are required because, with only the actuator mechanism for moving the object lens in a tracking operation, all tracks cannot be accessed.

The circuits including the control circuits cited above need to be operated sequentially as follows.

In order to record a signal onto an optical disc or reproduce a signal from an optical disc, the actuator mechanism described in section (3) and the slider mechanism described in section (4) are controlled by operating their respective control circuits to focus the laser beam on the surface of the optical disc and to position the spot of the focused laser beam on a desired track of the disc. Then, the laser-emission control circuit described in section (1) as well as the opto-electrical conversion circuit described in section (2) are operated and, if necessary, the control circuit described in section (3) is again operated properly in order to achieve a state allowing a recording or reproduction operation to be carried out for the first time.

However, the optical disc drive is easily affected by variations from disc to disc and variations from apparatus to apparatus. In consequence, it is not easy to execute the proper control described above. In order to solve this problem, learning control has been much proposed. The learning control is executed to find a control value to be set in each of the control circuits (including mainly the actuator control circuit and the laser-emission control circuit) each time the control value is required.

In particular, it takes relatively long times in many cases to execute the learning control of the laser-emission control system to learn a recording optical power and learn an emission timing of the recording emission power. The emission timing is determined to adjust the so-called time-axis phase, which is referred to simply as a recording phase for the sake of simplicity.

In addition, the mechanisms described above and the control circuit system must be capable of handling a disc of another type in some cases. In such cases, the type of a disc is recognized from a variety of physical quantities such as amplitudes of various control feedback signals and amplitudes of information reproduction signals. It takes a relatively long time to identify the type of a disc from such physical quantities. Examples of the control feedback signals and the information reproduction signals are an error signal of a beam reflected by the disc and used in the focusing control or the tracking control and a signal proportional to a rotational speed of the disc. The signal proportional to a rotational speed is used in control of the disc rotation and embedded on tracks of the disc in advance.

In order to correctly identify the type of the recording medium, it is necessary to read out information on the recording medium and information on a physical format for each medium type from the recording medium. The information on the recording medium and the information on a physical format for each medium type have been recorded on the recording medium in advance.

It is also necessary to read out information on medium management from the recording medium. The information on medium management is information on management of defects in the case of a rewritable disc or information on locations to which additional data can be written in the case of an addable-type disc. It also takes a relatively long time to read out these pieces of information on management. In particular, in the case of an addable-type disc, it is necessary to verify that a location at which data was recorded last as described by the medium-management information read out from the recording medium indeed matches a location preceding a location to which additional data can be written. That is to say, it takes a very long time to carry out a step for searching the disc recording medium for a location at which data was actually recorded last.

In accordance with specifications, in an information recording apparatus for recording information onto a disc recording medium, in addition to the building-up step of the rotation of the disc to reach a steady state, there is a number of much-time consuming operations that need to be completed before a recordable state of the disc is achieved after the power-supply is turned on.

That is to say, in the case of the conventional described above, there is specially no description of a technique to avoid a period of time during which data cannot be recorded onto the disc recording medium for the reasons described above. It is thus a third object of the present invention to avoid a period of time during which data cannot be recorded onto the disc recording medium for the reasons other than the building-up step of the rotation of the disc to reach a steady state.

In order to solve the problems described above, the present invention provides the following means.

In the first place, in order to achieve the first object of the present invention, the present invention provides a configuration in which, instead of observing a condition for switching from an unrecordable state to a recordable state, an operation to supply information stored in a memory means to a recording means employed in a drive is started at a stage the amount of information stored in the memory means exceeds a predetermined quantity.

In the second place, in order to achieve the second object of the present invention, the present invention provides a display means allowing the user to recognize a startable recording state.

In the third place, in order to achieve the third object of the present invention, first of all, the present invention provides a means for monitoring operations to mount and dismount the disc recording medium on and from the information recording apparatus. If the means clearly verifies no replacement of the disc recording medium mounted on the drive, some or all of the steps that consume much time, causing the problems described above can be eliminated. The steps include the step to recognize the type of the disc recording medium, the step to read out the information on medium management from the disc recording medium or search the disc recording medium for a location at which user data was actually recorded last in the case of an addable-type disc recording medium and the step to learn a recording power and a recording phase. As a result, it is possible to considerably reduce the length of a period of time during which the information recording means employed in the drive is put in an unrecordable state after the power-supply is turned on.

Specifically, the present invention provides a configuration in which, if the disc recording medium is inserted and the power-supply is turned on for the first time, the user is informed of the fact that an operation to record data onto the disc recording medium can be started after the information recording means for carrying out the activation steps described above in accordance with a first stepping procedure enters a recordable state. In the same configuration, if the power-supply is turned on for the second or subsequent time, the user is informed of the fact that an operation to record data onto the disc recording medium can be started after the information recording means for completes operations in accordance with a second stepping procedure eliminating some time-consuming ones of the activation steps described above prior to a recordable state.

As described above, the present invention exhibits an effect that a simple algorithm is capable of avoiding an unrecordable state due to, among other causes, the disc rotation's buildup step with a duration equal to a relatively fixed period of stepping time.

In addition, a time-consuming step, which is to be carried out after the power-supply is turned on, can be eliminated during an activation step following a second or subsequent power-on operation but not during an activation step following the first power-on operation in order to avoid an unrecordable state that would take a long time.

Furthermore, by informing the user that an operation to record data onto the disc recording medium can be started, the user is capable of easily identifying a timing to operation to record data onto the disc recording medium.

DETAILED DESCRIPTION OF THE INVENTION

Figure 1:
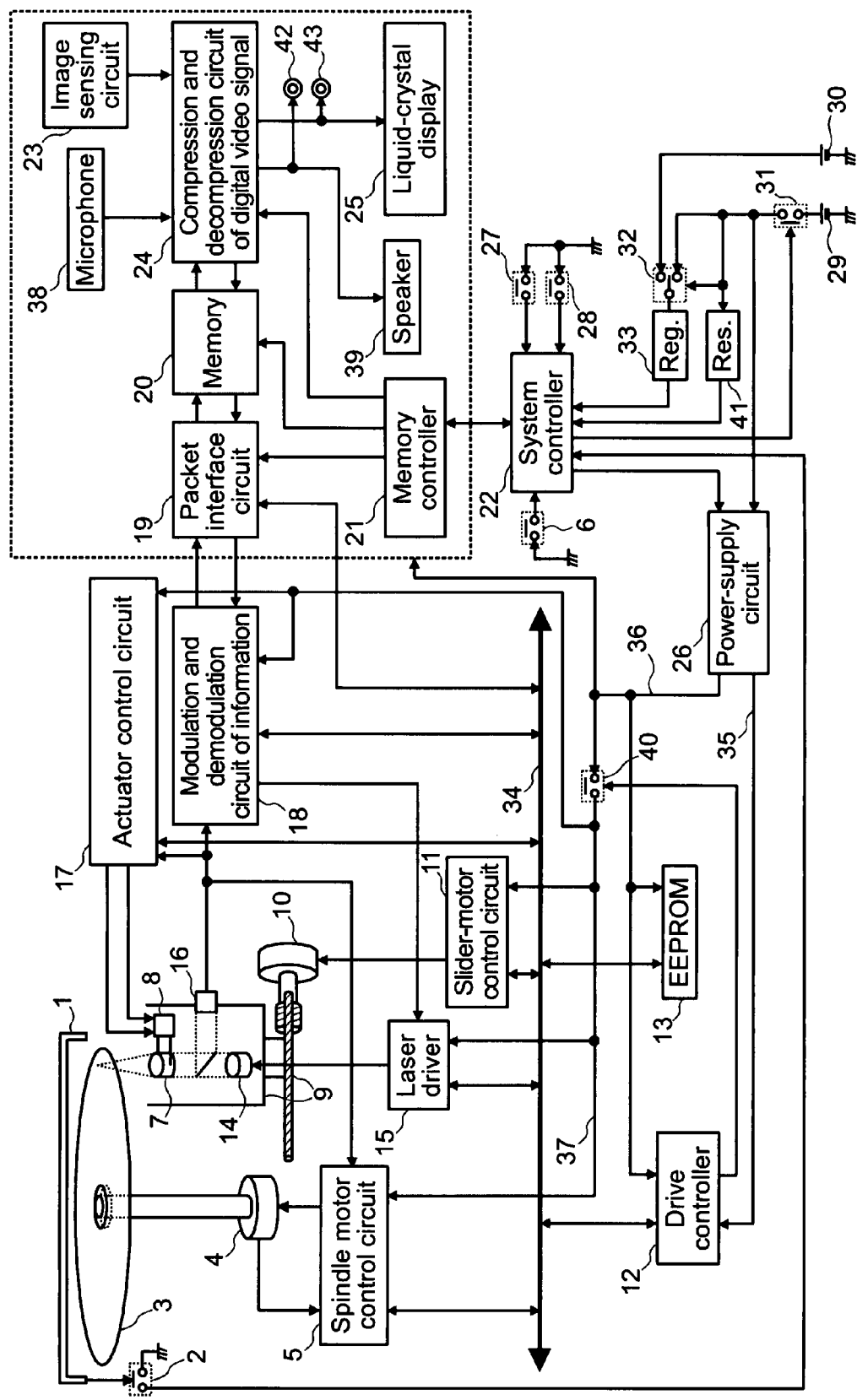
FIG. 1 is an explanatory block diagram showing the configuration of an embodiment of the present invention.

Preferred embodiments of the invention are explained by referring to FIGS. 1 to 4 as follows. An embodiment of the invention implements a video camera for recording an image signal onto an optical disc. The image signal is a signal obtained as a result of an image taking operation carried out by an image taking unit employed in the video camera. The description begins with an explanation of operations of components and a configuration comprising the components with reference to FIG. 1.

First of all, implementation of a means for mounting and demounting a disc on and from a disc drive unit is explained.

Reference numeral 1 denotes a cover of a case for accommodating an optical disc 3. Reference numeral 2 denotes a switch for detecting an opened or closed state of the cover 1. The cover switch 2 is connected to a system controller 22. The system controller 22 is a microstepor powered by a main battery 29 through a main power-supply switch 31, a power-supply series regulator circuit 33 and a power-supply changeover switch 32 or by a backup battery 30 through the power-supply series regulator circuit 33 and the power-supply changeover switch 32. Thus, even if power-supply switch 31 is turned off, cutting off the power supplied by the main battery 29 to the system controller 22, an operation carried out by the system controller 22 is continued, enabling the system controller 22 to receive a signal indicating the opened/closed state of the cover 1 from the cover switch 2. As a result, the system controller 22 is capable of recognizing the possibility that the optical disc 3 has been mounted or demounted on or from the case for accommodating an optical disc 3.

Next, a control means for controlling a spindle motor is explained.

Reference numeral 4 denotes a spindle motor for driving the rotation of the optical disc 3. The spindle motor 4 outputs a signal proportional to its own rotational speed to a spindle motor control circuit 5. The spindle motor control circuit 5 measures a period and a phase of the signal proportional to the rotational speed and compares the measured period and the measured phase with a target period and a target phase respectively. The spindle motor control circuit 5 then outputs speed-error signals representing a difference between the measured period and the target period as well as a difference between the measured phase and the target phase to the spindle motor 4 in order to control the spindle motor 4.

In addition, an opto-electrical conversion circuit 16 detects a frequency signal included in a beam reflected by the optical disc 3 and supplies the frequency signal to the spindle motor control circuit 5. The frequency signal is proportional to the rotational speed of the optical disc 3. The frequency signal is embedded in advance in tracks on the optical disc 3 as a format. The spindle motor control circuit 5 generates a control signal and outputs the control signal to the spindle motor 4 in order to control the rotational speed of the spindle motor 4 to a predetermined rotational speed. To put it in more detail, the spindle motor control circuit 5 adjusts the rotational speed of the spindle motor 4 so that the frequency signal read out from the tracks of the optical disc 3 approaches a value corresponding to the predetermined rotational speed as much as possible.

Next, the spindle motor control circuit 5 for controlling the spindle motor 4 is explained.

Reference numeral 9 denotes a slider mechanism on which an object lens 7, an actuator mechanism 8, a laser diode 14 and the opto-electrical conversion circuit 16 are mounted. Reference numeral 10 denotes a slider motor. The slider motor 10 is typically a micro-step motor. Reference numeral 11 denotes a slider-motor control circuit for receiving a set value from a drive controller 12 and outputting a two-phase rectangular or sinusoidal driving signal to the slider motor 10. The frequency of this driving signal determines a distance by which the slider mechanism 9 is to be moved.

Next, an actuator control means for controlling the actuator mechanism 8 is explained.

The actuator mechanism 8 is a component for controlling the object lens 7. To put in detail, the actuator mechanism 8 moves the object lens 7 in the direction of the optical axis and the radial direction of the optical disc 3 in accordance with a control signal generated by an actuator-servo control circuit 17. The actuator-servo control circuit 17 generates focusing and tracking error signals on the basis of an electrical signal obtained as a result of an opto-electrical step carried out by the opto-electrical conversion circuit 16 on a beam reflected by the optical disc 3. The actuator-servo control circuit 17 then outputs the control signal to the actuator mechanism 8 after carrying out proper control compensation.

Next, an information recording and reproduction means for recording and reproducing a signal onto and from the optical disc 3 is explained. Reference numeral 14 denotes a laser diode. A laser beam emitted by the laser diode 14 hits the object lens 7. The output of the laser diode 14 is controlled by a laser driver 15. The laser driver 15 controls the laser beam emitted by the laser diode 14 to a predetermined output value in a reproduction operation. In a recording operation, on the other hand, the laser driver 15 controls the laser diode 14 to emit a laser beam corresponding to a modulated signal as much as possible. The modulated signal is received from a modulation and demodulation circuit 18. The laser driver 15 is switched from a recording mode to a reproduction mode and vice versa by a driver controller 12.

A beam reflected by the surface of the optical disc 3 is supplied the opto-electrical conversion circuit 16, being converted into an electrical signal, which is then fed to the modulation and demodulation circuit 18. The modulation and demodulation circuit 18 demodulates the electrical signal. The modulation and demodulation circuit 18 is also switched from a modulation mode to a demodulation mode and vice versa by the driver controller 12.

Figure 2:
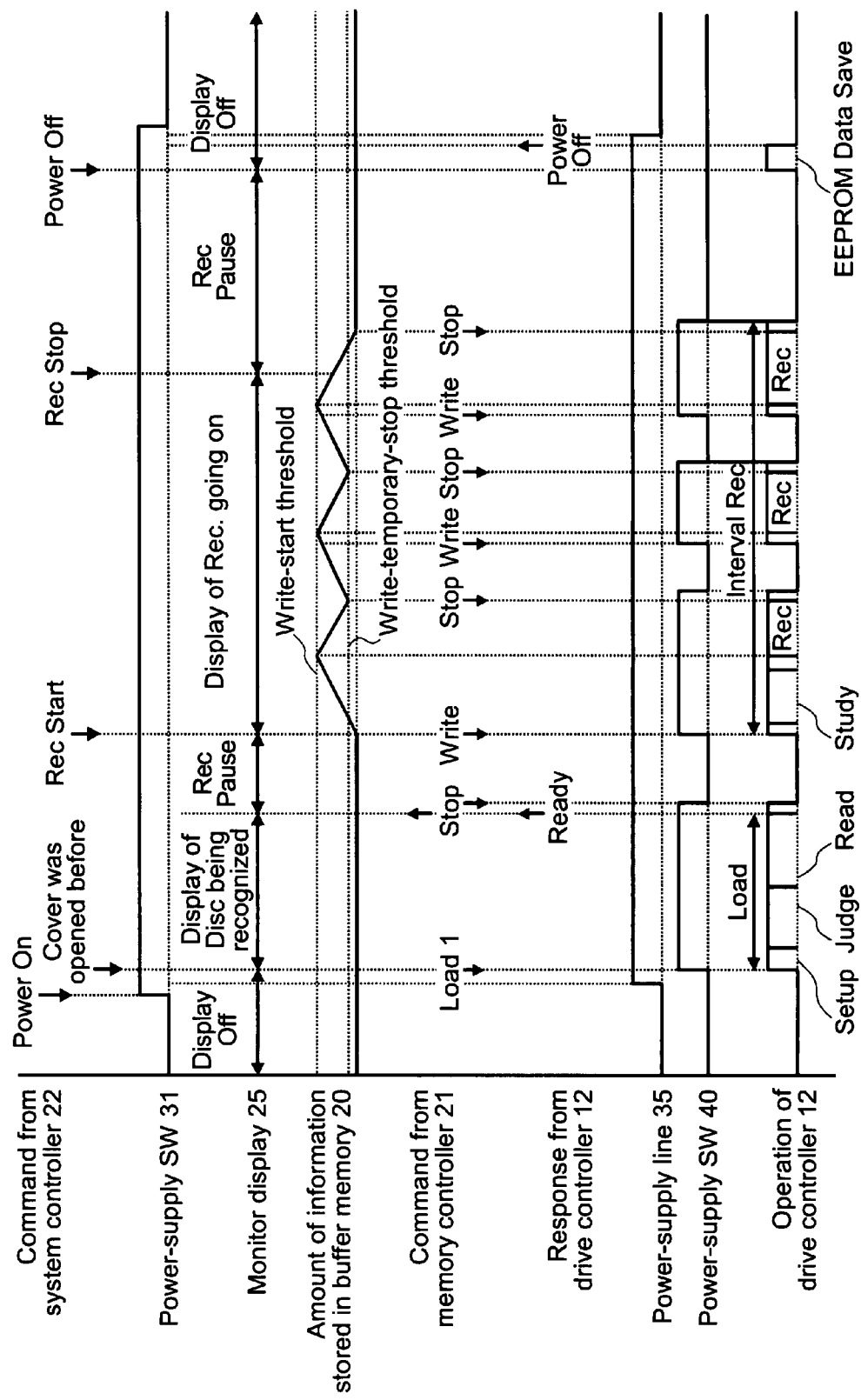
FIG. 2 shows first timing charts used for explaining operations carried out by and embodiment of the present invention.

By referring to FIG. 2, the following description explains operations carried out by an apparatus at the upper level of the drive unit shown in FIG. 1.

The description begins with an explanation of a state in which the power-supply switch 31 is put at an OFF position. With the power-supply switch 31 put at an OFF position, the power-supply changeover switch 32 is put at a position of selecting the backup battery 30. In this state, power is supplied by the backup battery 30 to the system controller 22 by way of the power-supply series regulator circuit 33 so that the system controller 22 is capable of monitoring the cover switch 2 and a power-supply on/off command switch 6.

Assume that, in this state, the user enters a command to turn on the power by operating the power-supply on/off command switch 6. In this case, the system controller 22 turns on the power-supply switch 31. When the power-supply switch 31 is turned on, the power-supply changeover switch 32 is switched by a switching signal to a position of selecting the main battery 29. The switching signal is also used by a reset-signal generation circuit 41 as a base for switching the system controller 22 from a low power consumption mode in which power is supplied from the backup battery 30 to a normal mode. Time charts shown in FIG. 2 indicate a timing with which the power-supply switch 31 is turned on by a power-on command from the system controller 22.

In this state, the system controller 22 also activates a power-supply circuit 26. When activated, the power-supply circuit 26 generates a power-supply signal 36 supplied to a variety of components and a reset signal 35 supplied to the driver controller 12. Receiving the reset signal 35, the driver controller 12 enters a state of waiting for a command to be transmitted from the upper level unit by way of a packet interface circuit 19.

If the cover switch 2 is changed from an opened state to a closed state while the power-supply switch 31 is at the OFF position, the system controller 22 informs the memory controller 21 of the change in state.

Informed of the change in state, through the packet interface circuit 19, the memory controller 21 issues a request to the driver controller 12 to carry out an activation step according to a first activation method at a point of time indicated by an arrow Load 1 in FIG. 2. Receiving the request, the driver controller 12 activates a power-supply switch 40 in the drive unit to start an operation to supply power to a variety of components employed in the drive unit during a period of time indicated by notation Load in FIG. 2.

Figure 4:
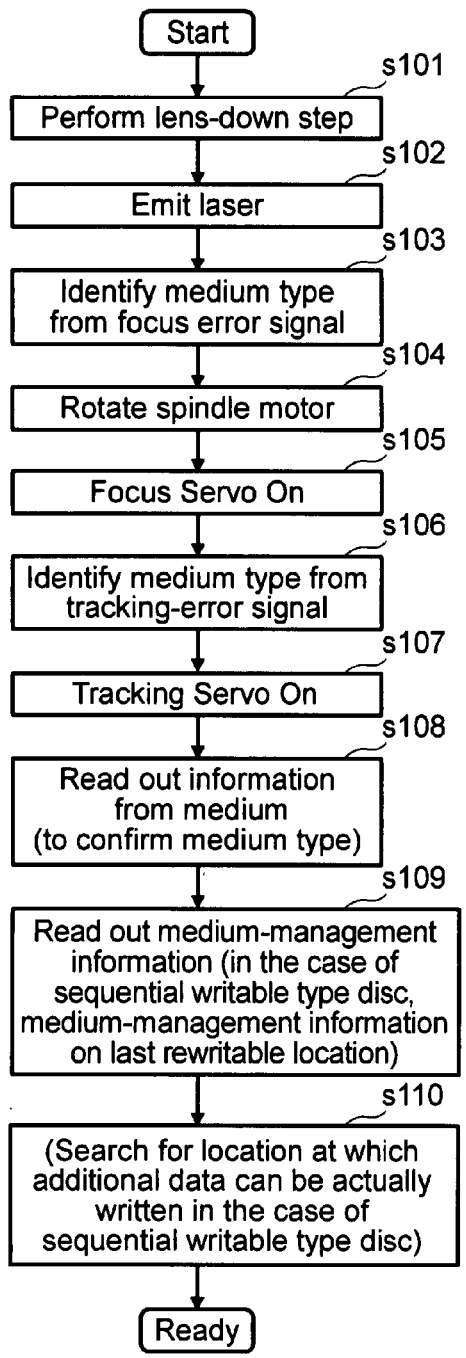
FIG. 4 shows an explanatory flowchart representing a load step carried out by a drive controller 12 provided by an embodiment of the present invention.
Figure 4:
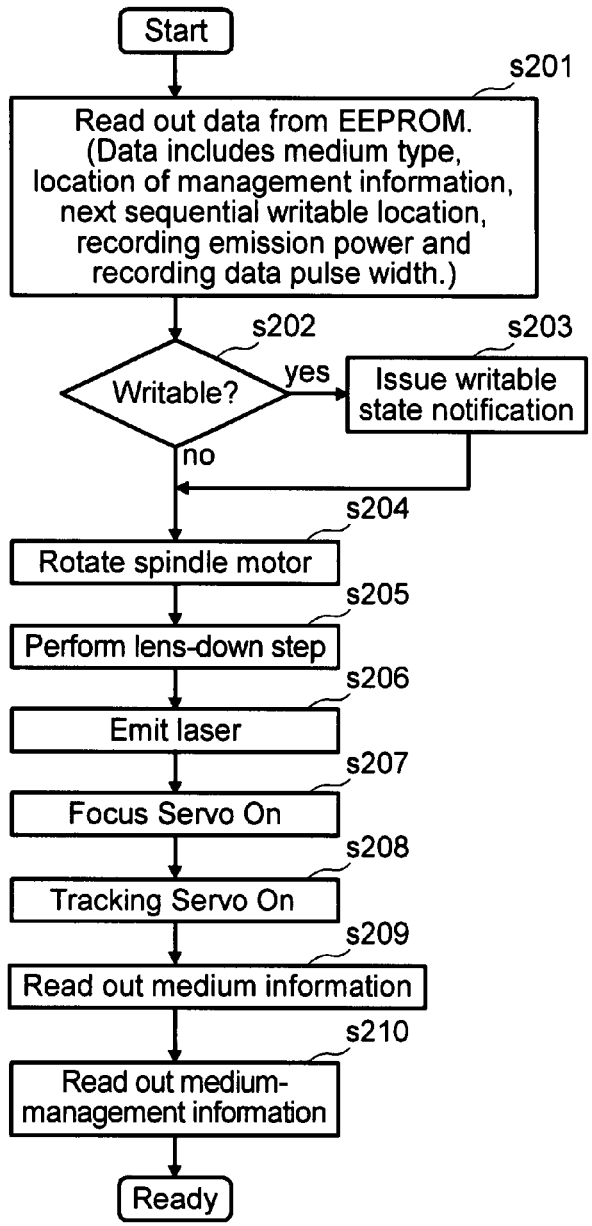

An example of this activation step is represented by a flowchart (1) of FIG. 4. As shown in the figure, the flowchart begins with a step s101 at which the actuator-servo control circuit 17 is operated to drive the actuator mechanism 8 to carry out a lens-down step (s101). In the lens-down step, the object lens 7 is moved away from the optical disc 3. Then, at the next step s102, the laser driver 15 is operated to drive the laser diode 14 to emit a laser beam at a predetermined emission power. In this way, the laser beam is radiated all of a sudden to the surface of the optical disc 3 without being focused.

Subsequently, at the next step s103, the driver controller 12 operates the actuator-servo control circuit 17 to drive the object lens 7 up and down in the direction of the optical axis. A beam reflected by the optical disc 3 can thus be obtained through the opto-electrical conversion circuit 16 when the object lens 7 passes through an area around the focus point. A first stage classification step based on the amplitude of the reflected beam and other information is carried out.

Then, at the next step s104, the driver controller 12 operates the spindle motor control circuit 5 to start rotating the spindle motor 4. At this stage, the spindle motor control circuit 5 controls the spindle motor 4 by using a signal proportional to the rotational frequency of the spindle motor 4. The signal is generated by the spindle motor 4 itself.

Subsequently, at the next step s105, the driver controller 12 again operates the actuator-servo control circuit 17 to drive the actuator mechanism 8 to move the object lens 7 up and down in order to focus the laser beam on the surface of the optical disc 3.

As the laser beam gets focused on the surface of the optical disc 3, it is possible to observe a track-crossing signal indicating that the laser beam crosses a track created on the optical disc 3 due to eccentricity of the optical disc 3 itself of eccentricity existing in the spindle motor 4. Then, at the next step s106, the driver controller 12 further carries out a second step to classify the types of the optical disc 3 on the basis of information including the amplitude of the track-crossing signal supplied to the actuator-servo control circuit 17 from the opto-electrical conversion circuit 16. It is thus possible to roughly identify the physical type of the optical disc 3.

Subsequently, at the next step s107, the driver controller 12 operates the actuator-servo control circuit 17 to make a track indicated by the track-crossing signal follow the laser beam.

At this stage, preparations to read out information from the track on the optical disc 3 have been completed. Then, at the next step s108, the driver controller 12 reads out recording-medium information recorded in advance on a specific track prescribed by format specifications of the optical disc 3. The information on the recording medium theoretically confirms the type of the optical disc 3.

Subsequently, at the next step s109, the driver controller 12 reads out information on medium management. In the case of a rewritable disc, the information on medium management includes defect management information indicating a location on the surface of the disc at which a defect exists and indicates a spare recording location allocated as a substitute for the defective location. In order to assure safety, the information on defect management is generally copied and the information and its copies are recorded at a plurality of recording locations on the surface of the optical disc 3. In order to grasp the most reliable piece of information on defect management among the pieces of information on defect management, all the pieces of information on defect management are read out to determine the most reliable piece of information on defect management in case it is quite within the bounds of possibility that the optical disc 3 is replaced.

In the case of an addable-type disc, on the other hand, the information on medium management includes information indicating a location on the surface of the optical disc 3 at which data was recorded last. In the case of an addable-type disc, it is necessary to verify that the location at which data was recorded last indeed matches a location preceding a location to which additional data can be actually written. Thus, at the next step s110, the driver controller 12 searches the optical disc 3 for the location at which additional data can be actually written on the basis of the location at which data was recorded last.

What is described above is a first activation method. For the sake of convenience, a period of time indicated by notation Load in FIG. 2 is divided into sub-periods denoted by Setup, Judge and Read. The Setup sub-period of time is a sub-period during which the spindle motor 4 and the actuator mechanism 8 are controlled. The Judge sub-period of time is a sub-period during which the type of the optical disc 3 is identified. The Read sub-period of time is a sub-period during which the information on the medium or the information on the medium management is read out from the optical disc 3 or the optical disc 3 is searched for a location to which additional data can be added in the case of an addable-type disc.

Let us go back to the description of a case, in which the cover 1 was opened before the power-supply was turned on, with reference to FIGS. 1 and 2.

While the activation step is being carried out by the driver controller 12 in accordance with the first activation method, the system controller 22 requests the memory controller 21 to receive no request to start a recording operation from the user. In order to inform the user that no request to start a recording operation is accepted, the memory controller 21 displays a message, which indicates that a step to recognize the type of the optical disc 3 is going on, on a liquid-crystal monitor 25, by driving a compression and decompression circuit 24 to superpose the message on the image taking signal.

As the memory controller 21 is notified of the fact that the activation step carried out by the driver controller 12 in accordance with the first activation method has been completed through the packet interface circuit 19, the memory controller 21 passes on the notification to the system controller 22, and displays a message, which indicates that a recordable state has been reached, to the user on the liquid-crystal monitor 25 in the same way as the message, which indicates that a step to recognize the type of the optical disc 3 is going on, during a period referred to as a Rec Pause period in FIG. 2.

Receiving the notification, the system controller 22 starts an operation to monitor a button switch 27 to be operated by the user to enter a command to start or stop a recording operation.

If the system controller 22 does not detect an operation carried out by the user to enter a command to start a recording operation, the memory controller 21 issues a request to the driver controller 12 to stop operations in order to save energy. Receiving the request, the driver controller 12 stops the operations of the components and turns off the power-supply switch 40 in order to avoid the waste of power.

In this state, when the user operates the button switch 27 to enter a command to start a recording operation at a point of time indicated by an arrow Rec Start in FIG. 2, the system controller 22 accepts the command and passes on the command to the memory controller 21.

The memory controller 21 passes on the command to start a recording operation to the driver controller 12 as indicated by an arrow Write shown in FIG. 2. At the same time, a signal output by the image taking circuit 23 is encoded by the compression and decompression circuit 24 and an operation to start storing information in a memory circuit 20 is carried out. In addition, a message indicating that the recording operation has been started is displayed to the user on the liquid-crystal monitor 25 in a period called Display during Rec in FIG. 2.

Receiving the command to start a recording operation, the driver controller 12 turns on the power-supply switch 40 to resume the operation of the stopped spindle motor 4, the emission of a laser beam and the control of the actuator. Since the step of acquiring information for recognizing the type of the optical disc 3 and information on medium management as well as the step to verify a location on an addable-type disc to which data is to be added have already been completed, the activation step merely to resume the operation of the mechanism control system and to resume the emission of the laser beam can be completed in a relatively short period of time.

Since learning steps to find optimum values of the recording power supplied to the recording medium and the recording phase have not been carried out, however, the learning steps to find optimum values of at least either the recording power or the recording phase or both the recording power and the recording phase need to be carried out during the step of storing the image taking signal in the memory circuit 20.

The learning steps to find optimum values of the recording power and the recording phase are carried out in a trial-and-error manner to evaluate a condition, in which data is written onto the optical disc 3, by actually storing data onto the optical disc 3 while changing parameters for adjusting the recording power and the recording phase from time to time.

Thus, in the case of a rewritable disc, since an area for storing data in the trial-and-error step can be used repeatedly, the learning steps to find optimum values of the recording power and the recording phase can be carried out as part of the first-activation-method-based activation step following the power-on operation as described earlier.

In the case of an addable-type disc, on the other hand, an area for storing data in the trial-and-error step cannot be used repeatedly. Thus, there is a limit on the number of times the trial-and-error step can be carried out on a disc. For this reason, the learning steps to find optimum values of the recording power and the recording phase are not carried out as part of the first-activation-method-based activation step following the power-on operation. Instead, the learning steps are carried out when there is actually a request for such steps.

Even if the learning steps are completed, the memory controller 21 does not start a recording operation immediately. Instead, the memory controller 21 starts a recording operation after the amount of information of the image taking signal stored in the memory circuit 20 exceeds a first predetermined quantity.

As the recording operation is started, the amount of information stored in the memory circuit 20 gradually decreases. When the amount of information stored in the memory circuit 20 decreases to a value smaller than a second predetermined value, the memory controller 21 stops the recording operation. In addition, in order to reduce the amount of power consumed by the drive unit till the recording operation is resumed, the driver controller 12 is requested to stop operations. As requested, the driver controller 12 stops operations of the components and turns off the power-supply switch 40 in order to decrease power consumption.

With the recording operation stopped, the amount of information stored in the memory circuit 20 again increases. As the amount of information stored in the memory circuit 20 reaches a value slightly smaller than the first predetermined quantity, the memory controller 21 makes a request for the activation of the driver controller 12. Receiving the request, the driver controller 12 again turns on the power-supply switch 40 to operate the spindle motor control circuit 5, the laser driver 15 and the actuator-servo control circuit 17. This time, since the learning steps of the recording power and the recording phase have been completed, the recordable state can be reached in a short period of time.

The intermittent operations described above are carried out repeatedly till the user operates the button switch 27. As the user operates the button switch 27 to enter a command to stop the recording operation at a point of time indicated by an arrow Rec Stop in FIG. 2, the system controller 22 detects this command and informs the memory controller 21 that the recording operation is to be stopped. Receiving this notification, the memory controller 21 stops an operation to supply the image taking signal to the memory circuit 20 thereafter and changes the display appearing on the liquid-crystal monitor 25 to a state of being ready to start a recording operation. In addition, the memory controller 21 issues a request to the driver controller 12 to stop operations after waiting for all residual information left in the memory circuit 20 to be recorded by the drive unit onto the optical disc 3. Receiving this request, the driver controller 12 stops operations of components and turns off the power-supply switch 40 in order to decrease power consumption.

In this state, when the user operates the button switch 27 to enter a command to start a recording operation at a point of time not shown in FIG. 2, the system controller 22 accepts the command and passes on the command to the memory controller 21. Receiving the command, the memory controller 21 starts a recording operation to store the image taking signal in the memory circuit 20. Thereafter, the intermittent operations are carried out repeatedly in the same way as described above.

When the user operates the power-supply on/off command switch 6 with the recording operation stopped to make a request to cut off power supplied to the whole apparatus at a point of time indicated by arrow Power Off in FIG. 2, on the other hand, the system controller 22 detects this request and passes on this request to the memory controller 21. The memory controller 21 also informs the driver controller 12 that the power supplied to the whole apparatus is to be cut off.

Informed that the power supplied to the whole apparatus is to be cut off, the driver controller 12 saves the type of the disc recording medium currently mounted on the disc drive as well as the learning values of the recording power and the recording phase in a non-volatile memory circuit 13. In the case of an addable-type disc, the driver controller 12 also saves the information on matching between the last recording location included in the information on medium management and an actual recording location in the non-volatile memory circuit 13. In the case of a rewritable disc, on the other hand, the driver controller 12 also saves data such as information on validity of pieces of information on defect management recorded at a plurality of locations, that is, information indicating which pieces of information on defect management are valid, into the non-volatile memory circuit 13. After the step to save the information in the non-volatile memory circuit 13 is completed, the driver controller 12 notifies the memory controller 21 of the completion. Receiving this notification, the memory controller 21 passes on the notification to the system controller 22. Informed that the step to save the information in the non-volatile memory circuit 13 has been completed, the system controller 22 stops the operation of the power-supply circuit 26 in order to terminate a step to supply power to the drive unit and the image taking block. Thereafter, the system controller 22 merely continues execution of a program for monitoring the power-supply on/off command switch 6 and the cover switch 2, turning off the power-supply switch 31 in order to receive power-only from the backup battery 30 in a power-saving operation.

The above description explains the operations, which are carried out when the user enters a command to turn on the power-supply to furnish power to the whole apparatus if the cover 1 has been opened and closed with the power-supply cut off, indicating that it is quite within the bounds of possibility that the optical disc 3 has been replaced with another one. Next, by referring to FIGS. 1, 3 and 4 (2), the following description explains operations, which are carried out when the user enters a command to turn on the power-supply furnishing power to the whole apparatus if an operation to open and close the cover 1 has not been recognized at all with the power-supply cut off, indicating that it is out of the bounds of possibility that the optical disc 3 has been replaced with another one.

First of all, when the user operates the power-supply on/off command switch 6 to enter a command to turn on the power-supply, the system controller 22 detects this operation. At that time, the system controller 22 switches the source supplying power to itself from the backup battery 30 to the main battery 29. In addition, the system controller 22 operates the power-supply circuit 26 to carry out steps including an operation to supply power to the drive block and the image taking block through a power-supply line 36 in the same way as what has been described earlier by referring to FIG. 2.

The system controller 22 notifies the memory controller 21 that an operation to open and close the cover 1 has not been recognized during a period of time in which the power-supply is cut off. Receiving this notification, the memory controller 21 issues a command to carry out an activation operation according to a second activation method to the driver controller 12 at a point of time coinciding with an arrow Load 2 shown in FIG. 3.

Receiving the command, the driver controller 12 starts activation of the drive unit in a second-activation-method-based activation step represented by a flowchart shown in FIG. 4 (2). Details of the flowchart are explained as follows.

As shown in the figure, the flowchart begins with a step s201 at which information is read out from the non-volatile memory circuit 13. As described in the explanation of the operations with reference to FIG. 2, the information read out from the non-volatile memory circuit 13 includes the type of the disc recording medium currently mounted on the disc drive as well as the learning values of the recording power and the recording phase. In the case of an addable-type disc, the information read out from the non-volatile memory circuit 13 also includes the inform on matching between the last recording location included in the information on medium management and an actual recording location. In the case of a rewritable disc, on the other hand, the information read out from the non-volatile memory circuit 13 also includes data such as information on validity of information on defect management recorded at a plurality of locations, that is, information indicating which pieces of information on defect management are valid. The flow of the stepping then goes on to the next step s202 to form a judgment as to whether or not all pieces of information have been gathered and there will be no problems even if a recording operation is started. If all pieces of information have been gathered and there will be no problems even if a recording operation is started, the flow of the stepping goes on to a step s203 at which the memory controller 21 is notified that all pieces of information have been gathered and there will be no problems even if a recording operation is started. Receiving this notification, the memory controller 21 displays a message indicating that a recording operation can be started on the liquid-crystal monitor 25 during a period of time indicated by Rec Pause in FIG. 3.

Refer back to the flowchart shown in FIG. 4 (2). Since the type of the optical disc 3 has been recognized from the information read out from the non-volatile memory circuit 13, the driver controller 12 operates the spindle motor control circuit 5, the laser driver 15 and the actuator-servo control circuit 17 in an order they are enumerated here at steps s204, s205, s206, s207 and s208 in order to transit to a state in which information can be read out from the optical disc 3. If all information on the medium has been stored in the non-volatile memory circuit 13, it is not necessary to carry out an operation to read out information from the optical disc 3. Since some information exists in the optical disc 3, however, in this embodiment, the information is read out from the optical disc 3 at the next step s209.

Then, at the next step s210, one valid piece of information on medium management is read out from the optical disc 3 if the optical disc 3 is a rewritable disc. Since information indicating which pieces of information on defect management are valid has been stored in the non-volatile memory circuit 13, however, the operation of the step s210 can be completed in a short period of time.

In the case of an addable-type disc, on the other hand, the information stored in the non-volatile memory circuit 13 also includes the inform on matching between the last recording location included in the information on medium management and an actual recording location. Thus, the search step can be eliminated. As a result, the operation of the step s210 can also be completed in a short period of time as well.

As described above, for a disc experiencing an activation step according to the first activation method in the past, the time it takes to carry out an activation step can be shortened substantially. Thus, it is possible to display a message indicating that the resumption of a recording step is allowable on the liquid crystal monitor 25 during a period of time indicated by Rec Pause in FIG. 3. That is to say, if the driver controller 12 is requested to implement the second activation method, the memory controller 21 informs the user that the resumption of a recording step is allowable without waiting for a report of activation-step completion to be issued by the driver controller 12 as long as there is no condition for objections in data stored in the non-volatile memory circuit 13 (for example, as long as the user did not make a request for an operation to cut off power before the type of the recording medium could be identified when the drive unit was activated by adoption of the first activation method).

Figure 3:
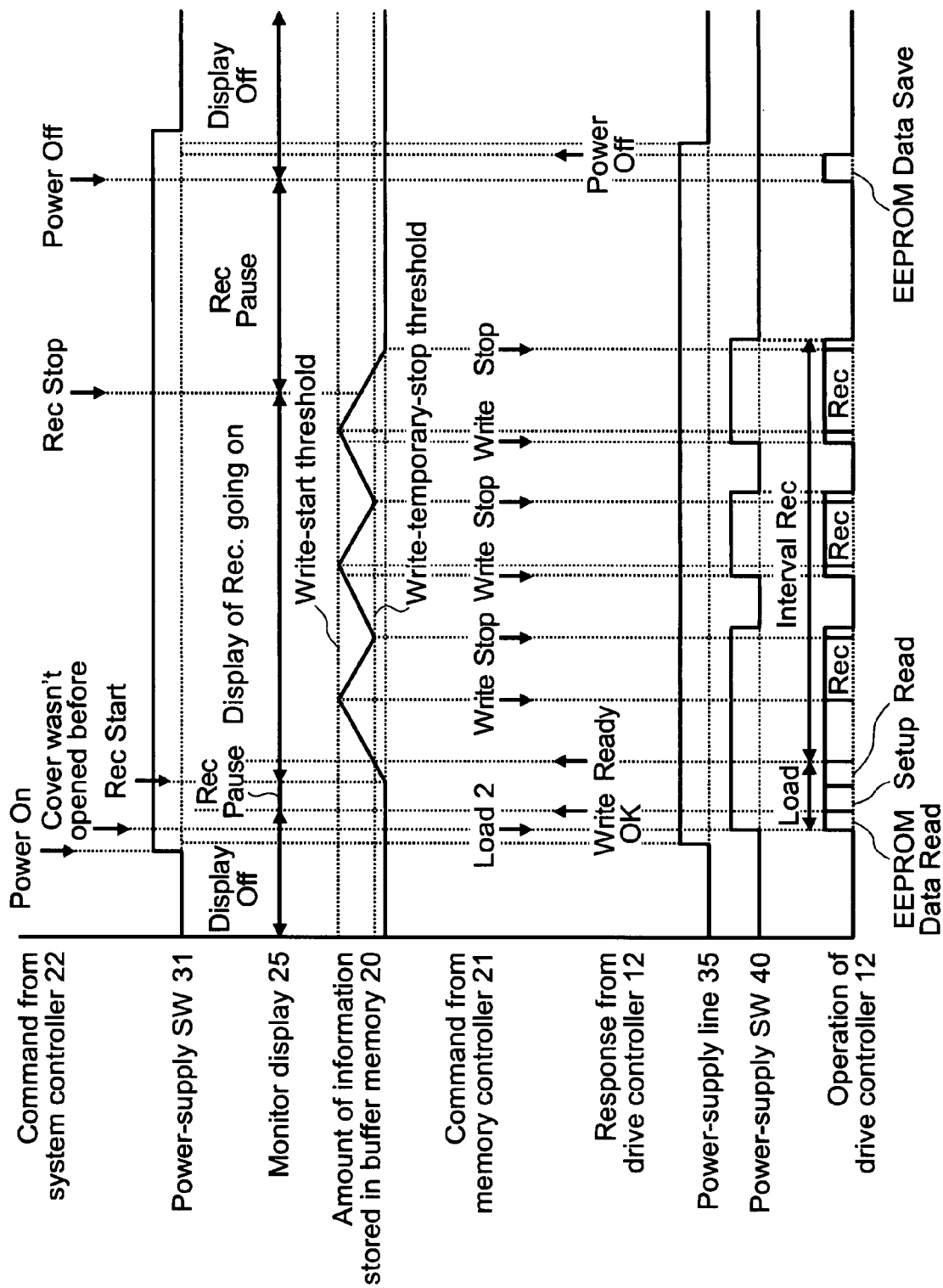
FIG. 3 shows second timing charts used for explaining operations carried out by an embodiment of the present invention.

Refer back to the time charts shown in FIG. 3. If the user operates the button switch 27 to enter a command to start a recording operation while the driver controller 12 is activating the drive unit by adoption of the second activation method, the system controller 22 detects this command and passes on the command to the memory controller 21. Receiving this command, the memory controller 21 starts an operation to store the image taking signal in the memory circuit 20. Since the activation step according to the second activation method can be completed in a relatively short period of time as described above, the activation step according to the second activation method can be completed before the amount of the image taking signal stored in the memory circuit 20 exceeds the first predetermined quantity. Thus, the memory controller 21 may start an actual recording operation as soon as the amount of the image taking signal stored in the memory circuit 20 exceeds the first predetermined quantity in the same way as that explained earlier by referring to the time charts shown in FIG. 2 without taking the operation of the driver controller 12 into consideration.

Thereafter, the amount of information stored in the memory circuit 20 gradually decreases and intermittent recording operations are carried out repeatedly in the same way as that explained earlier by referring to the time charts shown in FIG. 2. In addition, if the user enters a command to stop the recording operation to be followed by a command to cut off power supplied to the whole apparatus, operations are carried out also in the same way as that explained earlier by referring to the time charts shown in FIG. 2.

Thereafter, if the optical disc 3 is not replaced with another one while no power is being supplied to the whole apparatus, a subsequent step to transit to a recordable state at power-on is carried out by adoption of the second activation method described above. Thus, the user is allowed to enter a command to start a recording operation without the need to wait for the activation step to be completed.

What is claimed is:

1. An information recording apparatus for recording information, comprising:

a buffer memory which stores information;

a recording portion which records information that is stored in the buffer memory onto a recording medium;

a command portion to initiate storing information into the buffer memory;

a power-supply portion to supply power;

a power-supply switch to connect and disconnect the power from the power-supply portion respectively to and from the recording portion;

a non-volatile memory; and a control portion which reads out relevant information from the non-volatile memory beginning when the power-supply switch connects the power from the power-supply portion to the recording portion and, when the relevant information is judged to satisfy a predetermined condition, then the control portion signals the command portion to initiate storing information into the buffer memory at a time prior to the recording portion being able to record information onto the recording medium, wherein the non-volatile memory stores a memory capacity of the recording medium, an initial recording position, and a defect information of the recording medium as the relevant information, wherein the recoding portion starts to record information onto the recording medium on the basis of the relevant information.

2. The information recording apparatus according to claim 1, wherein when it is determined that the relevant information does not satisfy the predetermined condition, then the control portion signals the command portion to initiate storing information into the buffer memory at a time after the recording portion is able to record information onto the recording medium.

* * * * *